United States Patent
Lim et al.

(10) Patent No.: US 8,018,858 B2
(45) Date of Patent: Sep. 13, 2011

(54) IMS REREGISTRATION METHOD AND SYSTEM THEREFOR

(75) Inventors: Han-Na Lim, Siheung-si (KR); Tae-Sun Yeoum, Seoul (KR); Eun-Hui Bae, Seoul (KR); O-Sok Song, Suwon-si (KR); Sung-Ho Choi, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 817 days.

(21) Appl. No.: 11/972,917

(22) Filed: Jan. 11, 2008

(65) Prior Publication Data

US 2008/0175157 A1 Jul. 24, 2008

(30) Foreign Application Priority Data

Jan. 11, 2007 (KR) .................. 10-2007-0003534
Mar. 19, 2007 (KR) .................. 10-2007-0026651

(51) Int. Cl.
*H04L 12/26* (2006.01)
(52) U.S. Cl. ...................................... 370/242
(58) Field of Classification Search ............. 455/466, 455/435.1, 433, 432.2, 456.1–456.6, 410, 455/411; 370/352, 331, 329, 401, 389, 395.21, 370/338, 242
See application file for complete search history.

(56) References Cited

U.S. PATENT DOCUMENTS

| 6,859,651 | B2 | 2/2005 | Gabor |
| 2007/0275710 | A1 | 11/2007 | Mayer et al. |
| 2008/0020789 | A1* | 1/2008 | Yan et al. ...................... 455/466 |
| 2008/0045214 | A1* | 2/2008 | Wen et al. ................... 455/435.1 |
| 2008/0092224 | A1* | 4/2008 | Coulas et al. .................... 726/12 |
| 2009/0093249 | A1* | 4/2009 | Zhu et al. ...................... 455/433 |
| 2009/0131090 | A1* | 5/2009 | Jo et al. .......................... 455/466 |

FOREIGN PATENT DOCUMENTS

| KR | 1020060033407 | 4/2006 |
| KR | 1020060063992 | 6/2006 |
| WO | WO 03/096603 | 10/2003 |

* cited by examiner

*Primary Examiner* — Melody Mehrpour
(74) *Attorney, Agent, or Firm* — The Farrell Law Firm, P.C.

(57) ABSTRACT

A method and system in which upon occurrence of a P-CSCF failure, a network sends an IMS reregistration request message to a UE. An S-CSCF or an AS monitors a P-CSCF to detect occurrence of a failure in the P-CSCF. Upon detecting the occurrence of a P-CSCF failure, the S-CSCF or the AS sends a request message for IMS reregistration to the UEs being served by the failed P-CSCF. In this manner, the UE can continuously receive the service even though a failure occurs in the P-CSCF.

19 Claims, 7 Drawing Sheets

IMS REREGISTRATION METHOD AND SYSTEM THEREFOR

PRIORITY

This application claims priority under 35 U.S.C. §119(a) to a Korean Patent Application filed in the Korean Intellectual Property Office on Jan. 11, 2007 and assigned Serial No. 2007-3534, and a Korean Patent Application filed in the Korean Intellectual Property Office on Mar. 19, 2007 and assigned Serial No. 2007-26651, the contents of which are incorporated herein by reference.

BACKGROUND OF THE INVENTION

1. Field of the Invention

The present invention relates generally to a network system including a Circuit Switched (CS) domain, an Internet Protocol (IP) Multimedia Subsystem (IMS) domain and a Packet Switched (PS) domain, and in particular, to a method and system in which a network sends an IMS reregistration request message to a User Equipment (UE) upon occurrence of a Proxy Call Session Control Function (P-CSCF) failure.

2. Description of the Related Art

A CS scheme, the typical scheme for voice services and real-time services, means a scheme in which a CS-based fixed call route is established between one user and its counterpart user. IMS is suitable for data services, messaging services and file transfer services, as it improves transmission efficiency and guarantees transmission stability with the use of a PS-based unfixed call route based on Internet Protocol (IP). Such an IMS can support not only the simple point-to-point call but also the point-to-multipoint call in which multiple users simultaneously take part. In the CS scheme, transmission of messages and user traffics is achieved over a CS call, and in IMS, the transmission of messages and user traffics is achieved over an IMS session.

FIG. 1 illustrates a configuration of a network to which the present invention is applicable.

Referring to FIG. 1, the network, to which the present invention is applicable, is roughly divided into a radio access network 106 and a core network 102. A User Equipment (UE) 104 accesses the core network 102 over the radio access network 106. The core network 102 is roughly divided into a CS domain 112, a PS domain 110, and an IMS domain 108.

The CS domain 112 is composed of entities supporting a CS call. Among the entities, a Mobile Switching Center (MSC; not shown) processes the call signals incoming and outgoing from/to a mobile base station, and performs a centralized control function so that the mobile base station can efficiently operate. A Media Gateway (MGW; not shown) is a gateway supporting the bearer traffics and control traffics. A Short Message Service (SMS) Service Center (SMS-SC) 124 serves to transfer SMS, or SMS messages, to users. A Visitor Location Register (VLR) 122 manages all the user data necessary for user call processing and mobility management.

The PS domain 110 supports PS-based services, and is roughly divided into a Serving GPRS Support Node (SGSN) and a Gateway GPRS Support Node (GGSN).

A Home Subscriber Server (HSS) 120 or a Home Location Register (HLR), which is an entity used for both the CS domain 112 and the PS domain 110, manages subscription information, service information, and location information of the users. The HSS 120 is an evolved form of the HLR, and either of the two entities can be used in the present invention.

The IMS domain 108 is composed of entities supporting the IMS session. Among the entities, a Proxy-Call Session Control Function (P-CSCF) 116, a Serving-Call Session Control Function (S-CSCF) 114, and an Application Server (AS) 118 are related to the present invention. The P-CSCF 116 is an entry point for the IMS domain 108 of the UE 104, and with the use thereof, the UE 104, when accessing the radio access network 106, receives a P-CSCF address from the radio access network 106 or acquires it through a Dynamic Host Configuration Protocol (DHCP) query. The S-CSCF 114, an entity for performing the most important function of establishing an IMS session, serves to receive and process a Session Initiation Protocol (SIP) message delivered from the UE 104. That is, to provide the service as requested by the UE 104, the S-CSCF 114 delivers SIP messages to the entities in the IMS domain 108 so that the session is completed. The AS 118 is an entity for providing applications to the users, like an E-mail server.

In the network with the foregoing configuration, the UE should first perform IMS registration in order to receive IMS services. Through this process, a P-CSCF and an S-CSCF that serve the UE are determined. However, when it is impossible to serve the UE as failure occurs in the P-CSCF, the UE cannot receive the IMS service even though the radio bearer is alive between the UE and the radio access network. For example, if an incoming call for the UE arrives when P-CSCF failure has occurred, the network cannot deliver the call to the UE.

Conventionally, upon occurrence of the P-CSCF failure, the UE perceives the need for IMS reregistration and performs it as follows. The UE performs IMS registration by transmitting 'REGISTER', which is one of the SIP Methods, to an IMS network. Thereafter, the UE refreshes the IMS registration by sending REGISTER to the IMS network at stated intervals. After sending REGISTER, if a response message thereto is not received, the UE can perceive the occurrence of the P-CSCF failure. However, when the time interval for which the REGISTER is sent is long and the P-CSCF failure has occurred immediately after the refreshment of the IMS registration, the user cannot receive the call being delivered thereto for quite a long time.

SUMMARY OF THE INVENTION

An aspect of the present invention is to address at least the problems and/or disadvantages and to provide at least the advantages described below. Accordingly, an aspect of the present invention provides a network entity for monitoring a P-CSCF when a user cannot receive a call due to a P-CSCF failure, and a method and system for performing IMS reregistration using the same.

According to one aspect of the present invention, there is provided a method for performing Internet Protocol (IP) Multimedia Subsystem (IMS) reregistration of a User Equipment (UE). The method includes assigning one of a plurality of Proxy-Call Session Control Functions (P-CSCFs) to a UE that has requested IMS registration; monitoring occurrence of a failure in the multiple P-CSCFs; and upon detecting occurrence of a failure from at least one of the multiple P-CSCFs as a result of the monitoring, notifying at least one of the UEs being served by the failed P-CSCF to perform IMS reregistration.

According to another aspect of the present invention, there is provided a method for performing Internet Protocol (IP) Multimedia Subsystem (IMS) reregistration by a User Equipment (UE). The method includes receiving assignment of one of a plurality of Proxy-Call Session Control Functions (P-CSCFs) through IMS registration; when a failure occurs in the assigned P-CSCF, receiving an IMS reregistration request message from an Application Server (AS); and sending a request for IMS reregistration to a Serving-Call Session Control Function (S-CSCF), to be assigned a new P-CSCF.

According to further another aspect of the present invention, there is provided a system for supporting Internet Protocol (IP) Multimedia Subsystem (IMS) reregistration of a User Equipment (UE). The system includes a Serving-Call Session Control Function (S-CSCF) for monitoring a Proxy-Call Session Control Function (P-CSCF) that serves the UE, to detect occurrence of a failure of the P-CSCF; and an Application Server (AS) for receiving, from the S-CSCF, a failure occurrence notification message of the P-CSCF and information on UEs being served by the failed P-CSCF, and sending an IMS reregistration request message to the UEs.

According to yet another aspect of the present invention, there is provided a system for supporting Internet Protocol (IP) Multimedia Subsystem (IMS) reregistration of a User Equipment (UE). The system includes a Proxy-Call Session Control Function (P-CSCF) for serving a UE that has performed $3^{rd}$ party registration; and an Application Server (AS) for, upon detecting occurrence of a failure of the P-CSCF, sending an IMS reregistration request message to UEs being served by the failed P-CSCF.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will now be described in detail with reference to the accompanying drawings. In the following description, a detailed description of known functions and configurations incorporated herein has been omitted for clarity and conciseness.

The present invention monitors a P-CSCF to send a request message for IMS reregistration to the UEs being served by the failed P-CSCF when the user cannot receive a call due to a P-CSCF failure, thereby allowing the UE receiving the request message to perform IMS reregistration.

First Embodiment

According to a first embodiment of the present invention, when a failure occurs in a P-CSCF, an S-CSCF delivers, to an AS, a list of and information on the UEs being served by the P-CSCF. Then the AS delivers a request message for IMS reregistration to the UEs, and upon receiving the request message, the UEs perform IMS reregistration.

Figure 1:
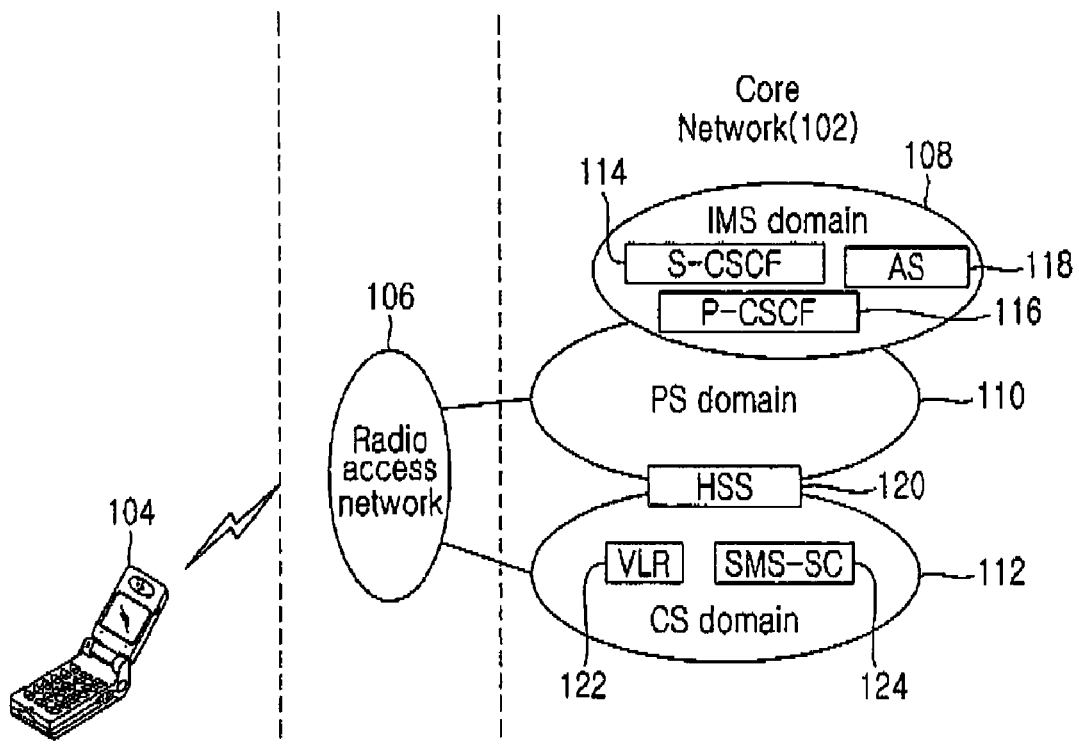
FIG. 1 is a diagram illustrating a configuration of a network to which the present invention is applicable.
Figure 2A:
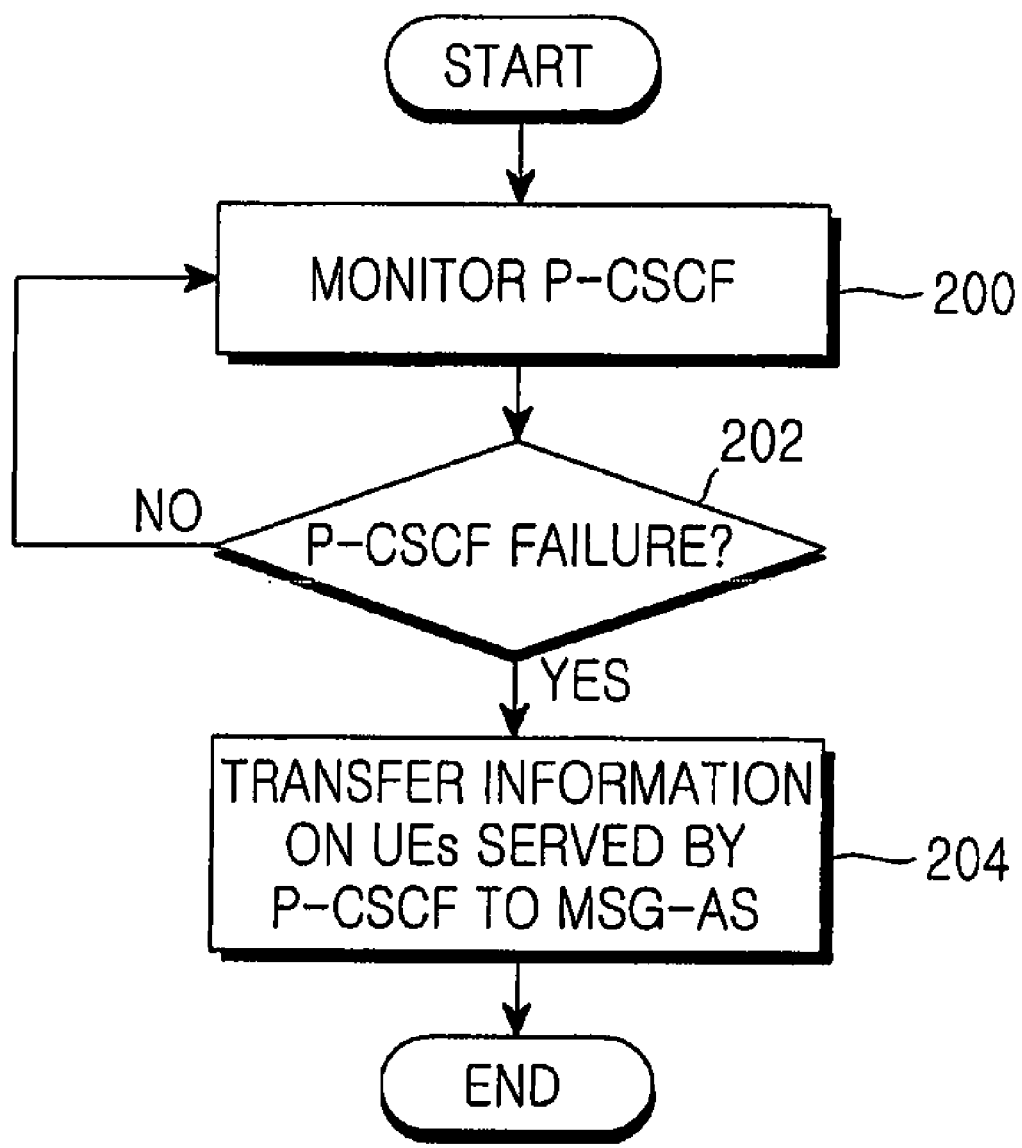
FIG. 2A is a diagram illustrating an operation of S-CSCF when the S-CSCF monitors a P-CSCF according to a first embodiment of the present invention.
Figure 2B:
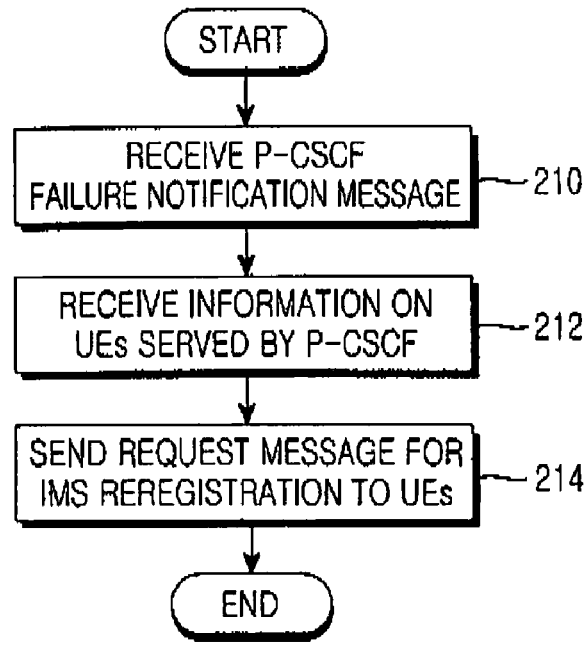
FIG. 2B is a diagram illustrating an operation of a MSG-AS when the S-CSCF monitors a P-CSCF according to the first embodiment of the present invention.
Figure 2C:
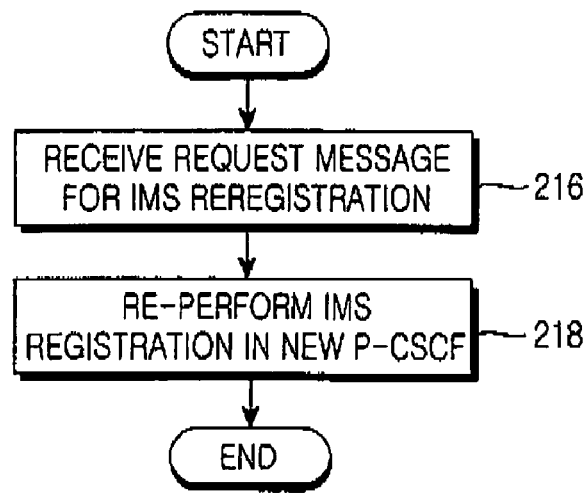
FIG. 2C is a diagram illustrating an operation of UE when the S-CSCF monitors a P-CSCF according to the first embodiment of the present invention.

FIGS. 2A to 2C illustrate operations of S-CSCF, AS and UE, respectively, when the S-CSCF monitors a P-CSCF according to the first embodiment of the present invention.

In the first embodiment of the present invention, the AS serves to receive information on the UEs being served by the failed P-CSCF and to deliver an IMS reregistration request message to the UEs. The AS in the first embodiment of the present invention will be referred to as 'MSG-AS' to distinguish it from an AS in a second embodiment of the present invention. However, it should be understood that it is not intended to limit the scope of the present invention to the name of the entities.

FIG. 2A illustrates an operation of an S-CSCF according to the first embodiment of the present invention.

Referring to FIG. 2A, the S-CSCF monitors the P-CSCF in step 200. In an exemplary method for monitoring the P-CSCF, the S-CSCF periodically sends a signal to the P-CSCF and interprets a state of the P-CSCF depending on a response signal received in response thereto. The inverse P-CSCF monitoring method is also available. However, other monitoring methods can also be used in the present invention. While monitoring the P-CSCF, if a P-CSCF failure occurs in step 202, the S-CSCF proceeds to step 204 where it delivers, to the MSG-AS, information on the UEs being served by the failed P-CSCF. It will be assumed herein that as the S-CSCF and the MSG-AS belong to the same service provider, or have made a particular agreement, so that there is no security problem even though the information on the UEs managed by the S-CSCF is delivered to the MSG-AS. Occasionally, this assumption may be unnecessary. When P-CSCF failure has not occurred in step 202, the S-CSCF returns to step 200 where it continuously monitors the P-CSCF.

FIG. 2B illustrates an operation of an MSG-AS according to the first embodiment of the present invention.

Referring to FIG. 2B, in step 210, the MSG-AS receives a message notifying the occurrence of a failure in the P-CSCF. In step 212, the MSG-AS receives information on the UEs being served by the failed P-CSCF, from the S-CSCF. The message received in step 210 can be included in the message received in step 212, and the two processes can be performed independently. Upon receiving the information on the UEs, the MSG-AS sends a request message for IMS reregistration to the corresponding UEs using the received information in step 214. The MSG-AS sends the IMS reregistration request message to an SMS-AS, which is an entity for interworking SMS with IP, and a detailed description of the method in which the UE receives the IMS reregistration request message using SMS will be made below with reference to FIG. 4.

FIG. 2C illustrates an operation of a UE according to the first embodiment of the present invention.

Referring to FIG. 2C, upon receiving an IMS reregistration request message from the MSG-AS in step 216, the UE performs IMS reregistration in a new P-CSCF in step 218. To find a new P-CSCF, the UE can use the conventional method used in IMS.

Second Embodiment

According to a second embodiment of the present invention, an AS monitors a P-CSCF serving the UE that has performed $3^{rd}$ party registration during IMS registration, to send a request message for IMS reregistration to the corresponding UEs upon occurrence of P-CSCF failure. The AS in the second embodiment of the present invention will be referred to as 'MON-AS' to distinguish it from the AS in the first embodiment. However, it should be understood that it is not intended to limit the scope of the present invention to the name of the entities.

Figure 3A:
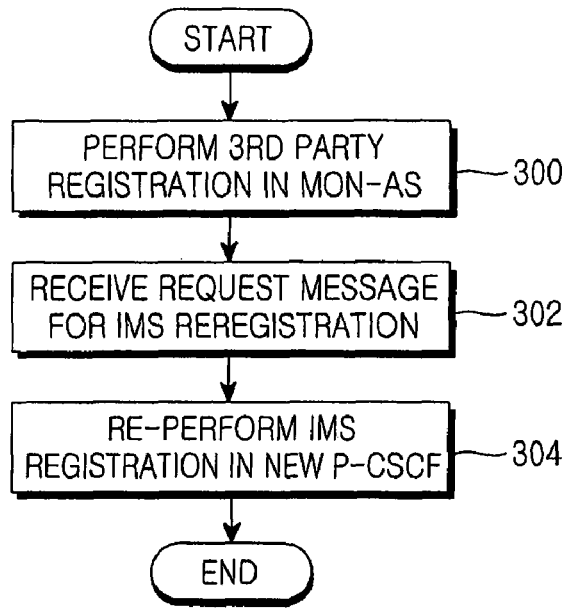
FIG. 3A is a diagram illustrating an operation of UE when the AS monitors a P-CSCF according to a second embodiment of the present invention.
Figure 3B:
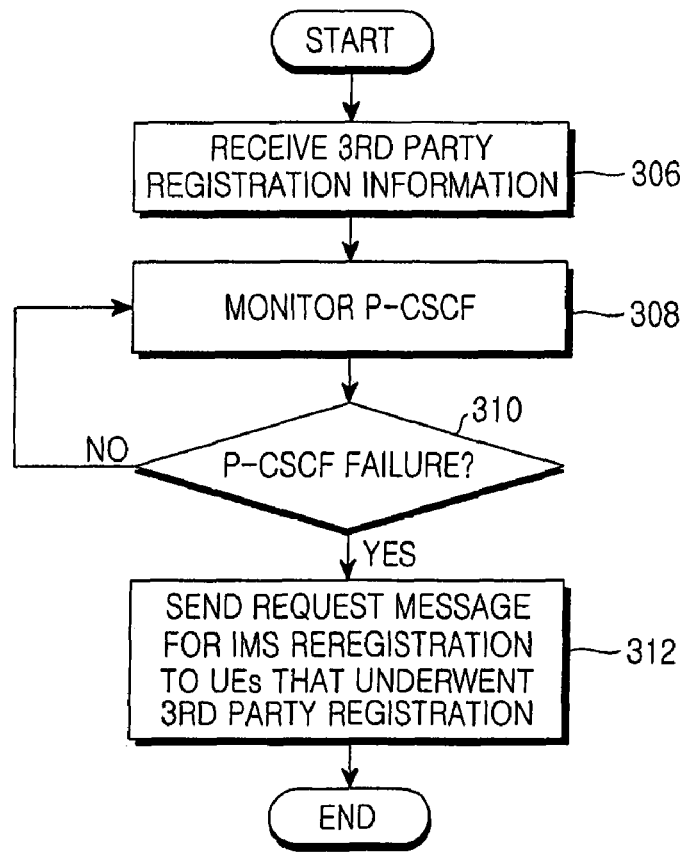
FIG. 3B is a diagram illustrating an operation of an MON-AS when the AS monitors a P-CSCF according to the second embodiment of the present invention.

FIGS. 3A and 3B illustrate operations of UE and AS, respectively, when the AS monitors a P-CSCF according to the second embodiment of the present invention.

FIG. 3A illustrates an operation of a UE according to the second embodiment of the present invention.

Referring to FIG. 3A, in step 300, the UE performs $3^{rd}$ party registration in an MON-AS. The $3^{rd}$ party registration that the UE performs during IMS registration means an operation in which the UE registers its own information in the AS from which it desires to receive a service. Specifically, if the UE sends a REGISTER Method used for performing IMS registration to the IMS network, the P-CSCF receives the REGISTER Method and forwards it to the S-CSCF that serves the UE. The S-CSCF perceives the need for registration in the AS, depending on an initial Filter Criteria (iFC) including service-related information of the UE. The S-CSCF forwards the REGISTER Method to the AS, and the AS registers therein UE information necessary for its service provision. Thereafter, the UE receives a request message for IMS reregistration from the MON-AS in step 302, and performs IMS reregistration in a new P-CSCF in step 304.

FIG. 3B illustrates an operation of an MON-AS according to the second embodiment of the present invention.

Referring to FIG. 3B, the MON-AS receives $3^{rd}$ party registration information from a UE in step 306. In this process, the MON-AS stores information on the UE and a P-CSCF serving the UE. Thereafter, the MON-AS monitors the P-CSCF in step 308. The P-CSCF monitoring method has been described in FIGS. 2A to 2C. In step 310, the MON-AS determines whether any failure has occurred in the P-CSCF. If it is determined that any failure has occurred in the P-CSCF, the MON-AS sends in step 312 a request message for IMS reregistration to the UEs being served by the failed P-CSCF among the UEs that have performed $3^{rd}$ party registration. However, if it is determined in step 310 that P-CSCF failure has not occurred, the MON-AS returns to step 308 where it continuously performs P-CSCF monitoring.

Figure 4:
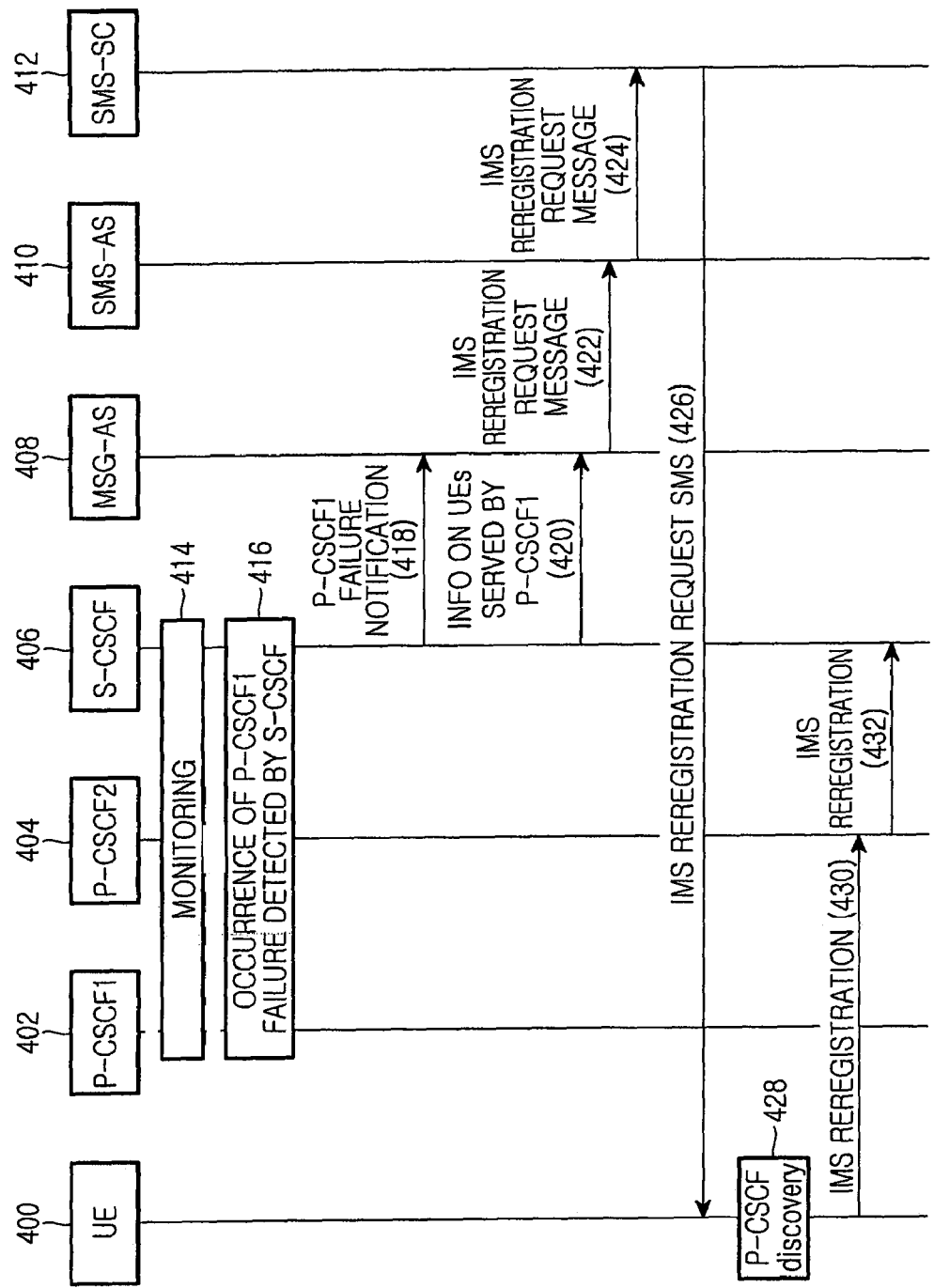
FIG. 4 is a diagram illustrating a control message flow according to the first embodiment of the present invention.

FIG. 4 illustrates a control message flow according to the first embodiment of the present invention.

Referring to FIG. 4, a P-CSCF1 402 is an entity in which a UE 400 has performed IMS registration, and a P-CSCF2 404 is an entity in which the UE 400 will perform reregistration upon receiving an IMS reregistration message. An SMS-AS 410, an entity for interworking SMS with IP, serves to send an IP message in an SMS form to the UE 400 in association with an SMS Service Center (SMS-SC) 412. A description of the other entities described above is omitted for conciseness.

As described in FIGS. 2A to 2C, an S-CSCF 406 monitors the P-CSCF1 402 in step 414. Upon detecting a failure of the P-CSCF1 402 in step 416, the S-CSCF 406 notifies an MSG-AS 408 of the failure of the P-CSCF1 402 in step 418. Further, in step 420, the S-CSCF 406 transmits information on the UEs being served by the failed P-CSCF1 402 to the MSG-AS 408. Steps 416 and 418 follow the description given in FIGS. 2A to 2C. In steps 422 and 424, the MSG-AS 408 transmits the information indicating the need for IMS reregistration to the UEs being served by the P-CSCF1 402. To perform this process, the MSG-AS 408 can generate as many IP messages as the number of UEs, and deliver the IP messages targeting the UEs to the SMS-AS 410. Alternatively, if the MSG-AS 408 delivers to the SMS-AS 410 a list of the UEs from which it will receive reregistration messages, the SMS-AS 410 can generate SMS and deliver it to each of the UEs. Upon receiving the IP message with the information indicating the need for IMS reregistration from the SMS-AS 410 in step 424, the SMS-SC 412 converts the IP message into the SMS format, and sends the SMS message to the UE 400 in step 428. Upon receiving the SMS request message for IMS reregistration, the UE 400, to perform IMS reregistration, performs in step 428 a P-CSCF discovery process defined in the conventional IMS, and performs in step 432 IMS reregistration in the new P-CSCF2 404. The succeeding IMS reregistration process follows the conventional IMS registration process.

Figure 5:
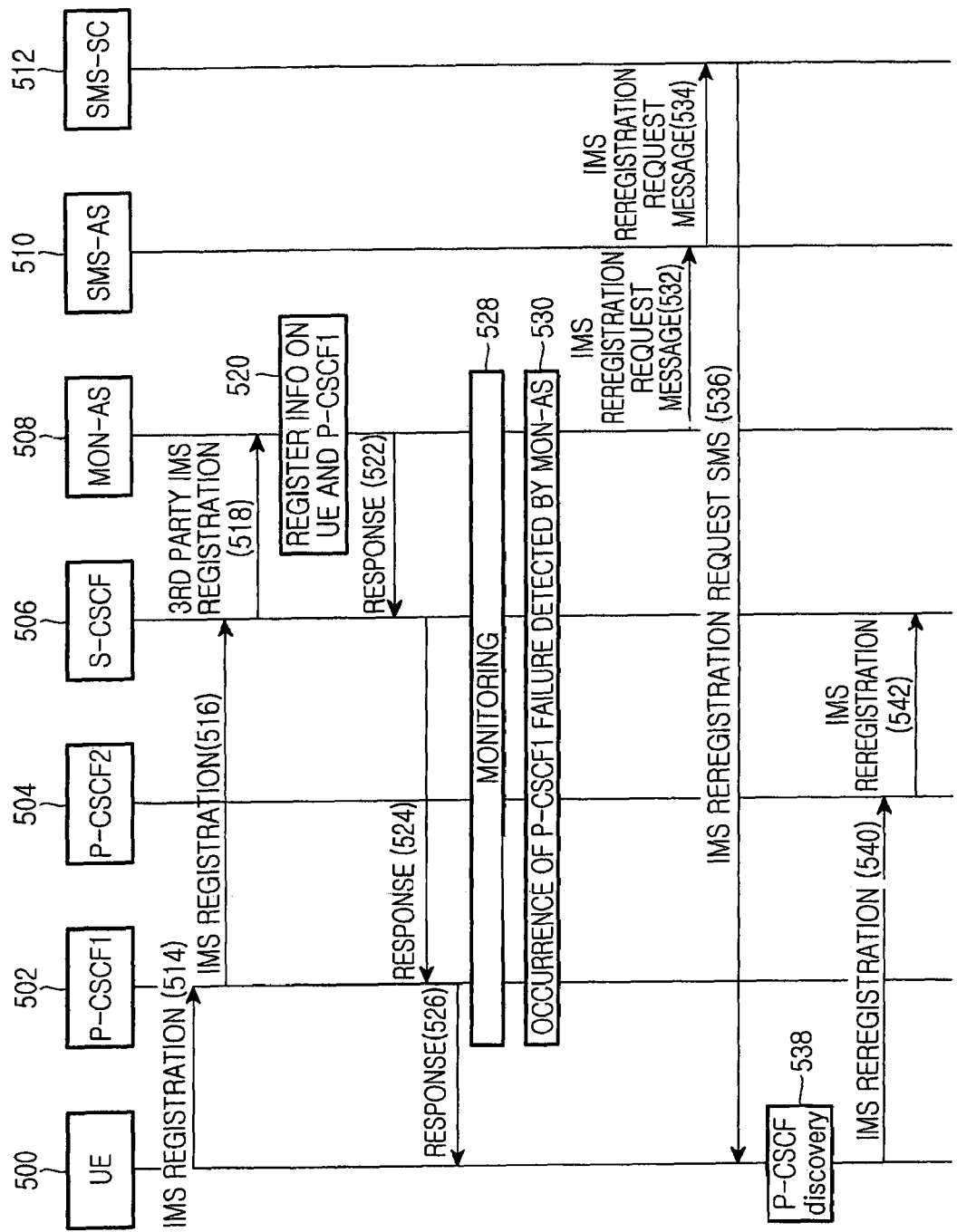
FIG. 5 is a diagram illustrating a control message flow according to the second embodiment of the present invention.

FIG. 5 illustrates a control message flow according to the second embodiment of the present invention.

Referring to FIG. 5, in steps 514 to 526, a UE 500 performs $3^{rd}$ party registration in an MON-AS 508. During the $3^{rd}$ party registration, the MON-AS 508 registers therein information on the UE 500 that performs the registration, and information on a P-CSCF1 502 serving the UE 500. Thereafter, the MON-AS 508 monitors the P-CSCF1 502 in step 528. Upon detecting the occurrence of a failure of the P-CSCF1 502 in step 530, the MON-AS 508 sends, in steps 532 to 542, an IMS reregistration request message to the UE 500 being served by the P-CSCF1 502 depending on the information on the UE 500 and the P-CSCF1 502, previously stored therein. Steps 532 to 542 are the same as steps 422 to 432 of FIG. 4, thus a description thereof is omitted for conciseness.

Next, with reference to the accompanying drawing, a description will be made of an operation of the SMS-AS according to an embodiment of the present invention.

The SMS-AS receives, from the MSG-AS or the MON-AS, indication information indicating the request for IMS reregistration for the UEs being served by the failed P-CSCF, and information on the UEs to which it should transfer the indication information.

The indication information can be delivered to the UE(s) in (1) a method of delivering the indication information using an IP signaling packet, (2) a method of delivering the indication information using a text included in a content body in an SIP message, and/or (3) a method of generating an SMS message with the indication information, including the entire SMS message in a content body in an SIP message and delivering the resulting SIP message. Other delivery methods are also available for the present invention.

Figure 6:
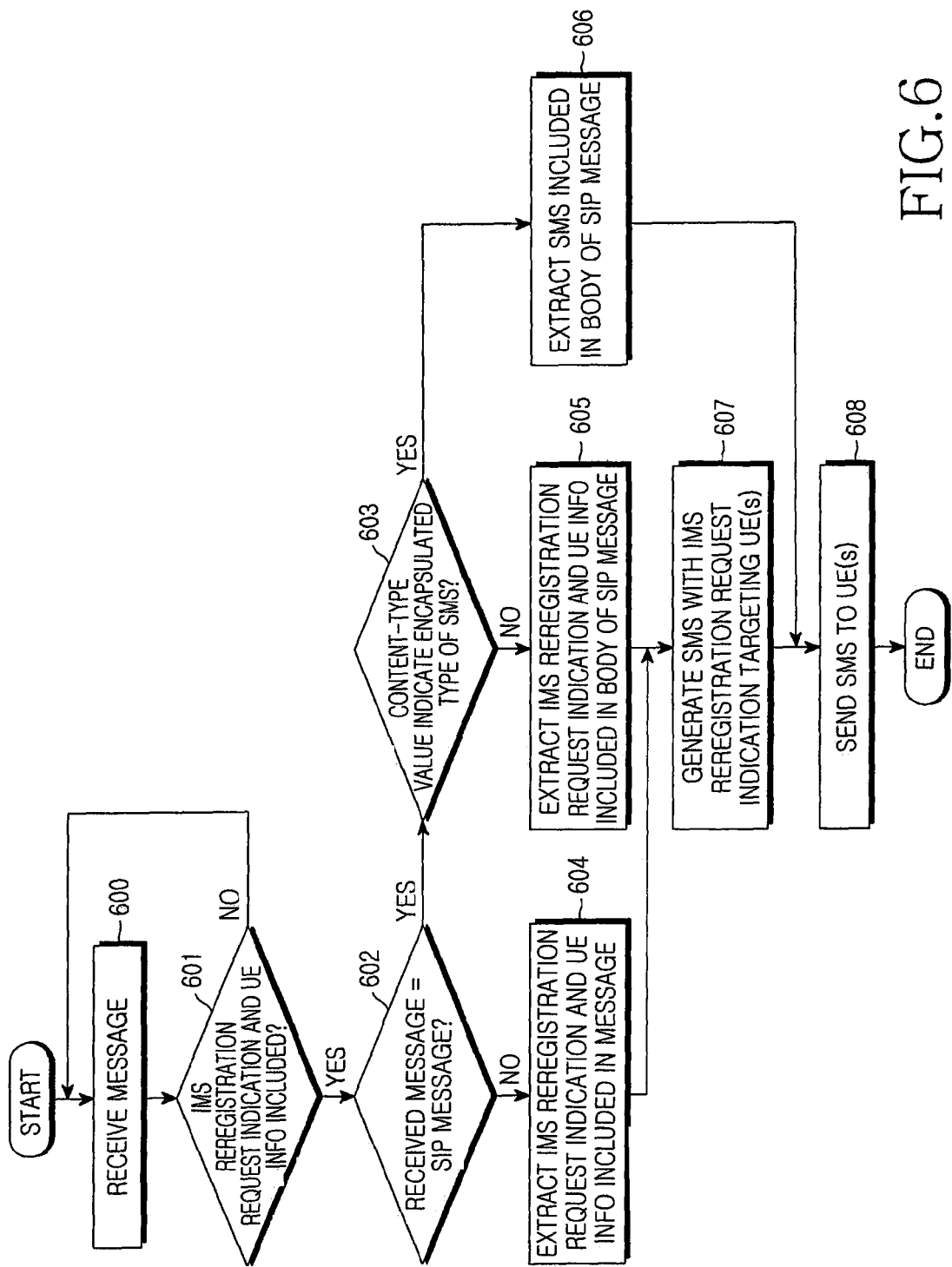
FIG. 6 is a diagram illustrating an operation of an SMS-AS according to the present invention.

FIG. 6 illustrates an operation of an SMS-AS according to an embodiment of the present invention.

Referring to FIG. 6, the SMS-AS receives a message in step 600. In step 601, the SMS-AS determines whether IMS reregistration request indication and UE information are included in the received message. If the received message does not include the above information, the SMS-AS returns to step 600 and receives a new message. However, if the received message includes the above information, the SMS-AS proceeds to step 602 where it determines whether the received message is an SIP message. If the received message is an SIP message, the SMS-AS proceeds to step 603 where it checks a content type of the SIP message to determine whether the message included in the content body is an encapsulated type of the SMS message. If the content type of the SIP message indicates an encapsulated type of the SMS message, the SMS-AS proceeds to step 606 where it extracts SMS included in the content body of the SIP message. Thereafter, in step 608, the SMS-AS delivers the extracted SMS to the UE.

However, if it is determined in step 602 that the received message is not an SIP message, the SMS-AS proceeds to step 604 where it extracts IMS reregistration request indication and UE information included in the received message. In step 607, the SMS-AS generates an SMS to be delivered to the UE, based on the information extracted in step 604. Thereafter, in step 608, the SMS-AS delivers the generated SMS to the UE.

However, if it is determined in step 603 that the content type of the received SIP message does not indicate an encapsulated type of the SMS message, the SMS-AS proceeds to step 605 where it extracts IMS reregistration request indication and UE information included in the content body of the SIP message. Thereafter, the SMS-AS generates an SMS to be delivered to each UE based on the extracted information in step 607, and then transmits the generated SMS to each UE in step 608.

As is apparent from the foregoing description, according to the present invention, the user can continuously receive the service even though a failure occurs in the P-CSCF, and the service provider can rapidly discover the P-CSCF failure and take an appropriate action, thereby reducing the possible loss occurring due to the interruption of the service provision.

In addition, the control message described herein can be realized in several message types such as SIP MESSAGE Method. The control message is subject to change in terms of its transmission order according to the circumstances. In addition, the SMS used herein to send the IMS reregistration message to the UE can be realized with an Unstructured Supplementary Service Data (USSD) message delivery scheme and/or other message delivery schemes.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for performing Internet Protocol (IP) Multimedia Subsystem (IMS) reregistration of a User Equipment (UE), the method comprising:
   assigning one of a plurality of Proxy-Call Session Control Functions (P-CSCFs) to a UE that has requested IMS registration;
   monitoring occurrence of a failure in the multiple P-CSCFs; and
   upon detecting occurrence of a failure from at least one of the multiple P-CSCFs as a result of the monitoring, notifying at least one of UEs being served by the failed P-CSCF to perform IMS reregistration.

2. The method of claim 1, wherein the monitoring comprises:
   monitoring the P-CSCF by a Serving-Call Session Control Function (S-CSCF).

3. The method of claim 2, wherein the notifying comprises:
   upon detecting the occurrence of a failure of the P-CSCF, sending by the S-CSCF a failure occurrence notification message to an Application Server (AS);
   transferring, by the S-CSCF, information on UEs being served by the failed P-CSCF to the AS; and
   sending, by the AS, an IMS reregistration request message to the UEs.

4. The method of claim 3, wherein the transferring information on UEs comprises:

generating, by the AS, as many IMS reregistration request messages as a number of UEs being served by the failed P-CSCF, and sending the IMS reregistration request messages to a message server (SMS-AS); and
converting, by the SMS-AS, the IMS reregistration request message into a Short Message Service (SMS) format, and sending the SMS to the UEs.

5. The method of claim 3, wherein the transferring information on UEs comprises:
   generating, by the AS, an IMS reregistration request message, and delivering the generated IMS reregistration request message to an SMS-AS along with a list of UEs that will receive the IMS reregistration request message; and
   converting, by the SMS-AS, the IMS reregistration request message into an SMS format, and delivering the SMS to the UEs.

6. The method of claim 1, further comprising:
   before the monitoring, registering, by an AS, the P-CSCF serving a UE that has performed $3^{rd}$ party registration;
   wherein the monitoring comprises monitoring the P-CSCF by the AS.

7. The method of claim 6, wherein the notifying comprises:
   sending, by the AS, an IMS reregistration request message to the UEs being served by the failed P-CSCF.

8. The method of claim 7, wherein the notifying comprises:
   generating, by the AS, as many IMS reregistration request messages as a number of UEs being served by the failed P-CSCF, and delivering the generated IMS reregistration request message to an SMS-AS; and
   converting, by the SMS-AS, the IMS reregistration request message into an SMS format, and sending the SMS to the UEs.

9. The method of claim 7, wherein the notifying comprises:
   generating, by the AS, an IMS reregistration request message, and delivering the generated IMS reregistration request message to an SMS-AS along with a list of UEs that will receive the IMS reregistration request message; and
   converting, by the SMS-AS, the IMS reregistration request message into an SMS format, and delivering the SMS to the UEs.

10. A method for performing Internet Protocol (IP) Multimedia Subsystem (IMS) reregistration by a User Equipment (UE), the method comprising:
    receiving assignment of one of a plurality of Proxy-Call Session Control Functions (P-CSCFs) through IMS registration;
    when a failure occurs in the assigned P-CSCF, receiving an IMS reregistration request message from an Application Server (AS); and
    sending a request for IMS reregistration to a Serving-Call Session Control Function (S-CSCF), to be assigned a new P-CSCF.

11. The method of claim 10, wherein the IMS reregistration request message is a Short Message Service (SMS) message.

12. The method of claim 10, wherein the IMS reregistration request message is an Unstructured Supplementary Data (USSD) message.

13. A system for supporting Internet Protocol (IP) Multimedia Subsystem (IMS) reregistration of a User Equipment (UE), the system comprising:
    a Serving-Call Session Control Function (S-CSCF) for monitoring a Proxy-Call Session Control Function (P-CSCF) that serves the UE, to detect occurrence of a failure of the P-CSCF; and an Application Server (AS) for receiving, from the S-CSCF, a failure occurrence notification message of the P-CSCF and information on UEs being served by the failed P-CSCF, and sending an IMS reregistration request message to the UEs.

14. The system of claim 13, wherein the AS generates as many IMS reregistration request messages as a number of UEs being served by the failed P-CSCF;

wherein the system further comprises a message server (SMS-AS) for receiving the IMS reregistration request message from the AS, converting the received IMS reregistration request message into a Short Message Service (SMS) format, and sending the SMS to the UEs.

15. The system of claim 13, wherein the AS generates an IMS reregistration request message;

wherein the system further comprises an SMS-AS for receiving the IMS reregistration request message from the AS along with a list of UEs that will receive the IMS reregistration request message, converting the IMS reregistration request message into an SMS format, and sending the SMS to the UEs.

16. A system for supporting Internet Protocol (IP) Multimedia Subsystem (IMS) reregistration of a User Equipment (UE), the system comprising:

a Proxy-Call Session Control Function (P-CSCF) for serving a UE that has performed $3^{rd}$ party registration; and an Application Server (AS) for, upon detecting occurrence of a failure of the P-CSCF, sending an IMS reregistration request message to UEs being served by the failed P-CSCF.

17. The system of claim 16, wherein upon receiving the IMS reregistration request message, the UE performs a P-CSCF discovery process and performs IMS reregistration.

18. The system of claim 16, wherein the AS generates as many IMS reregistration request message as a number of UEs being served by the failed P-CSCF;

wherein the system further comprises a message server (SMS-AS) for receiving the IMS reregistration request message from the AS, converting the received IMS reregistration request message into an Short Message Service (SMS) format, and sending the SMS to the UEs.

19. The system of claim 16, wherein the AS generates an IMS reregistration request message;

wherein the system further comprises an SMS-AS for receiving the IMS reregistration request message from the AS along with a list of UEs that will receive the IMS reregistration request message, converting the IMS reregistration request message into an SMS format, and sending the SMS to the UEs.

* * * * *